(No Model.) 3 Sheets—Sheet 1.

W. G. CREIGHTON.
CONDUIT SYSTEM FOR ELECTRIC RAILWAYS.

No. 525,945. Patented Sept. 11, 1894.

WITNESSES
John Fraser
James Row

INVENTOR
Wm. G. Creighton (No Model.)  3 Sheets—Sheet 2.
W. G. CREIGHTON.
CONDUIT SYSTEM FOR ELECTRIC RAILWAYS.
No. 525,945. Patented Sept. 11, 1894.
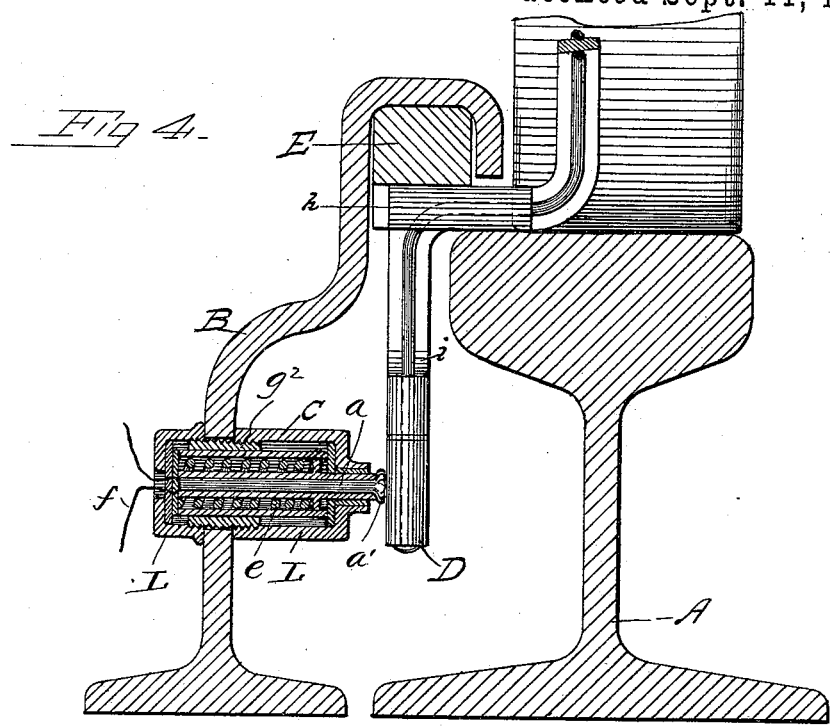
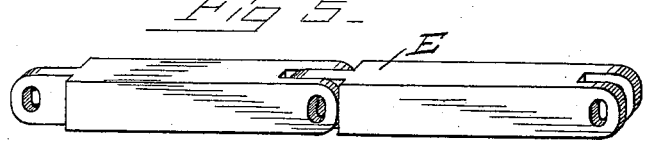
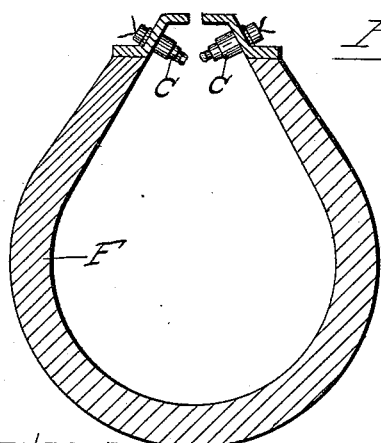
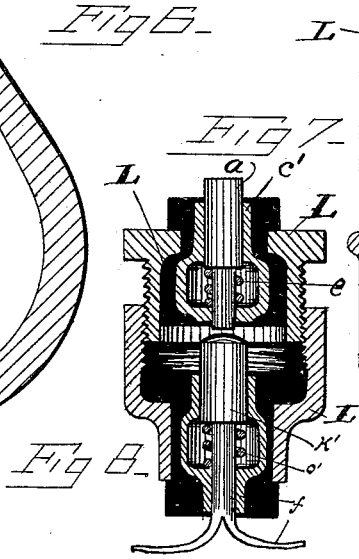
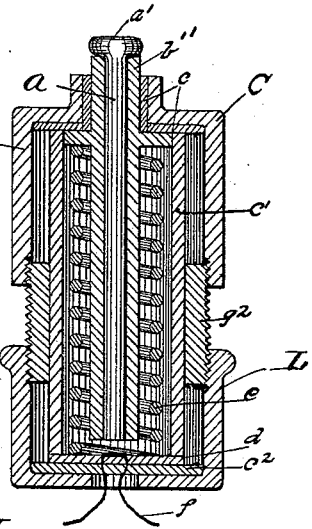
WITNESSES
John Fraser
James Low
INVENTOR
W. G. Creighton (No Model.) 3 Sheets—Sheet 3.

W. G. CREIGHTON.
CONDUIT SYSTEM FOR ELECTRIC RAILWAYS.

No. 525,945. Patented Sept. 11, 1894.

Witnesses
C. J. Williamson
Wm. J. Osgood

Inventor
Wm. G. Creighton,
per Chas. H. Fowler
Attorney

THE NORRIS PETERS CO., PHOTO-LITHO., WASHINGTON, D. C.

UNITED STATES PATENT OFFICE.

WILLIAM G. CREIGHTON, OF CHICAGO, ILLINOIS.

CONDUIT SYSTEM FOR ELECTRIC RAILWAYS.

SPECIFICATION forming part of Letters Patent No. 525,945, dated September 11, 1894.

Application filed February 28, 1894. Serial No. 501,892. (No model.)

*To all whom it may concern:*

Be it known that I, WILLIAM G. CREIGHTON, a citizen of the United States, residing at Chicago, in the county of Cook and State of Illinois, have invented certain new and useful Improvements in Conduits for Electric Railways; and I do hereby declare that the following is a full, clear, and exact description of the same, reference being had to the annexed drawings, making a part of this specification, and to the letters of reference marked thereon.

The present invention relates to closed conduit systems of electric railways, and more particularly is designed as an improvement upon the construction shown in my Patent No. 483,761, of October 4, 1892. I have aimed to cheapen the cost of construction of the conduit, to improve the slot closing feature and to provide an improved contact for closing the circuit between the main conductor and the traveling contact carried by the car.

To these ends my invention consists in the construction and combination of the part of a closed conduit, as hereinafter specified and claimed.

Figure 1:
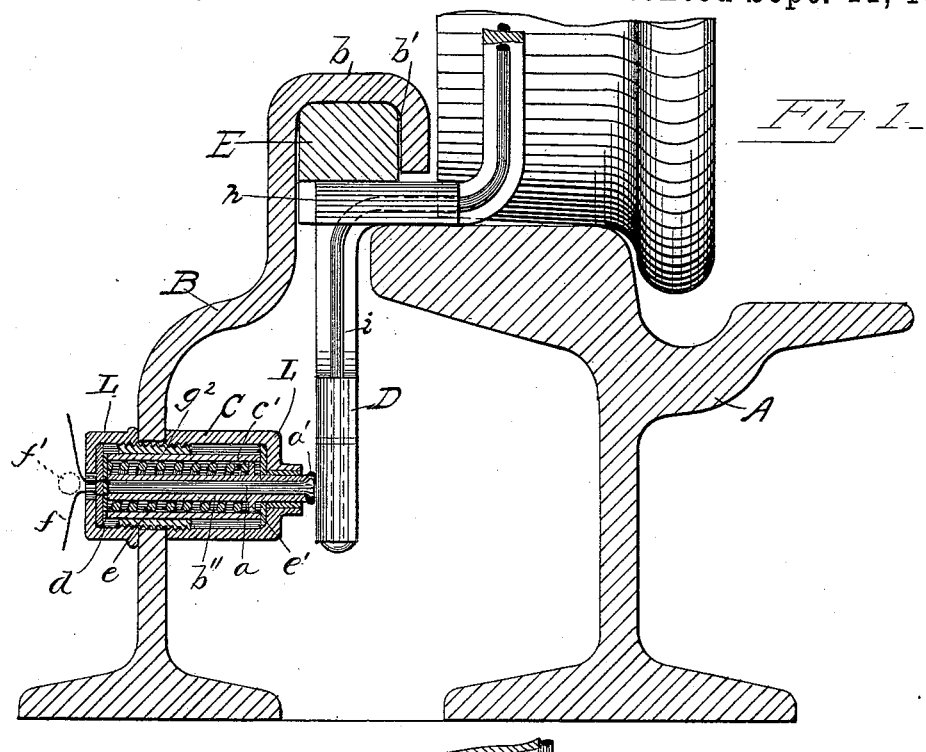
Figure 2:
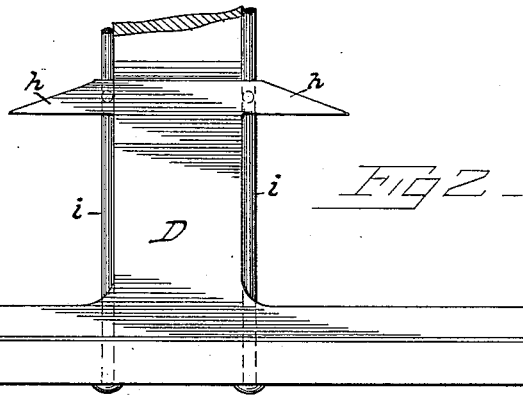
Figure 3:
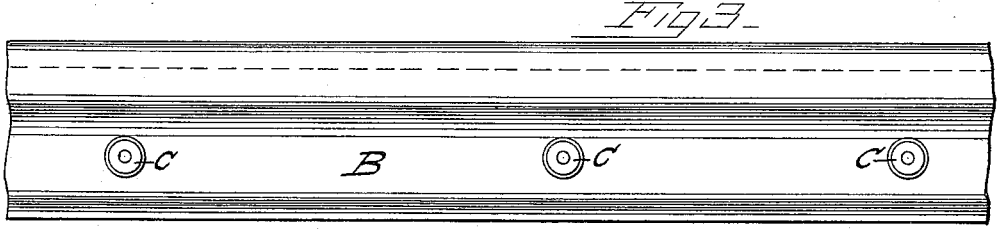
Figure 9:
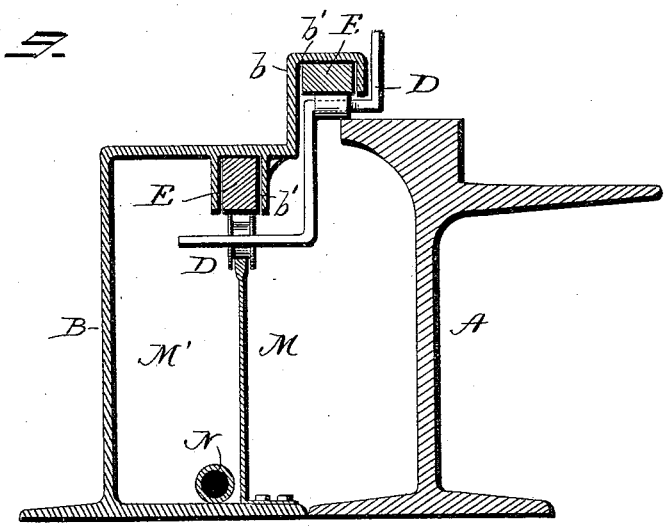
Figure 10:
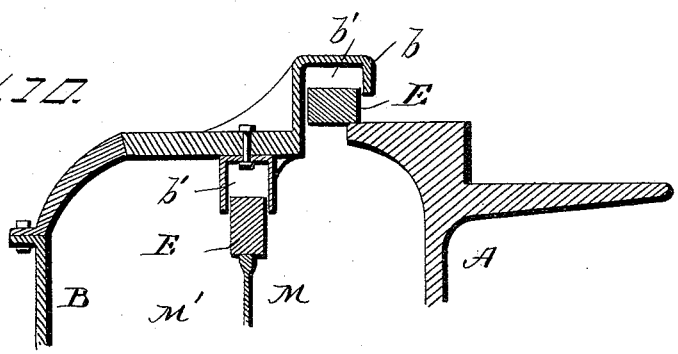
Figure 11:
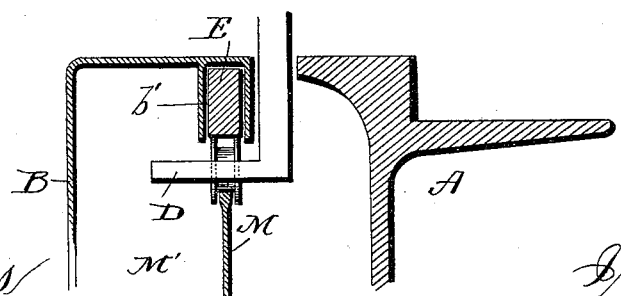

In the annexed drawings:—Figure 1 is a cross section of a closed conduit embodying my improvements. Fig. 2 is a side view of the traveling contact employed. Fig. 3 is a side view of a portion of the conduit; Fig. 4, a cross section showing a different form of track rail, and the contact applied thereto; Fig. 5, a detail view of a portion of the slot closer; Fig. 6, a cross section showing the contact applied to a different type of conduit; Fig 7, a detail view of the contact; Fig. 8, a like view of a modification of the contact. Figs. 9, 10 and 11, are views of modified forms of my conduit.

My invention belongs to that class of conduits that are placed adjoining the track rails and in carrying the invention into practice I employ the rail A to form part of the conduit, the remainder being formed by a plate or bar B placed alongside of and running parallel with the rail and having a grooved or channel-like portion $b$ that overhangs one edge of the tread of the rail so as to provide a lateral and vertical opening or slot that leads into the conduit. Through said slot passes the plow or traveling contact D that on two opposite sides has projections $h, h$, whose upper faces are beveled or inclined downward to enable them to readily engage and raise into the groove $b'$ of plate B, the flexible slot closer E that otherwise rests upon the edge of the rail, such being carried far enough within the plane of the groove to permit this. The sharp edges of the projections $h, h$, serve to scrape and keep clean the parts that they move over. The plow D is provided with conducting wires $i, i$, as shown, and as it moves through the conduit is adapted to successively engage fixed contacts C, and through them, close the circuit with the main conductor and supply the car motor, lamps, &c., with current.

The main conductor is outside the conduit as shown in Fig. 1 in dotted lines at $f'$, though it may be inside, and the contacts C are secured to the plate B. This location of the contacts is most desirable as no change in the ordinary rail is then necessary to adapt it for my purpose.

Each contact is constructed as follows:—A rod $a$ of copper or other good conducting material is inclosed in a tube $b''$ with its inner enlarged end $a'$ projecting beyond the latter, and inclosing these two, is a cylinder $c'$ in a space between which and said tube and surrounding the latter, is a coiled spring $e$ that at one end engages a flange $e'$ on the tube and acts normally to press the same and the rod $a$ inward in the path of the plow D. At its other end the spring bears against the closed end $d$ of the cylinder which is made of conducting material and to which is attached a wire $f$ by which connection is made with the main conductor, $f'$ the ends of said wire being turned or twisted around the latter, and the joint then well insulated.

For attaching the contact to the plate B or rail A, the latter is provided with a horizontal opening in which is placed an externally threaded sleeve $g^2$ so that its ends project upon both sides of said plate and upon each of said ends is screwed a thimble or cap L, L, that abuts at one end against the plate B. The sleeve $g^2$ snugly fits the cylinder and the latter can be moved longitudinally through it for the purpose of adjusting the contact $a$ by the proper manipulation of the thimbles. The outer thimble L is provided with an opening for the passage of the wire $f$ to the main wire and between said thimble and the end $d$ of cylinder *c'* is placed a disk of insulating material. Like materials insulates the rod *a* and its tube *b"* from the inner thimble, where they come adjacent.

In Fig. 8 is shown a construction in which the sleeve *g²* is omitted and the thimbles threaded and I substitute for the part *d* a sliding pin or rod K' that is yieldingly supported by a spring *o'*. The tube *b"* is also dispensed with, and in its stead, a portion of the cylinder *c'* is contracted in diameter to engage and guide the pin *a*. The pin or rod K' is inclosed by a cylindrical casing and guide similar to the one *c'*, and a body of insulating material (shown by solid black) is interposed between each cylindrical casing and the adjacent portion of a thimble L.

The spring *e* shown in Fig. 8 corresponds in purpose and function to the spring similarly designated and shown in the other figures, while the spring *o'*, by yieldingly supporting the contact rod or pin K' permits slight movement of the latter when the contact *a* is pressed against it, should the adjustment of said parts *a* and K' be so inaccurate as to necessitate such movement; or should there be irregularity in the plow D. Of course the connection of the pin or rod K' with the main conductor is such that the necessary slight movement of the said pin or rod K' can take place.

In Fig. 6 the contact C is shown applied to the slot rail of a midtrack conduit F.

In Figs. 9, 10, and 11, I show a vertical partition M between the rail A and plate B forming a conduit M' with which communication is had over the top of said partition the space above the latter being closed by a slot closer E that is vertically movable in a groove *b'* and adapted to rest on the top of said partition. The groove may be formed by parts integral with the plate B as seen in Figs. 9 and 10 or separate therefrom in the form of a grooved or channeled bar and attached by bolts, as shown in Fig. 10. In Figs. 9 and 10 the slot closer just described supplements the one that rests upon the rail A.

For keeping the conduit dry I provide as shown in Fig. 9, a steam or hot air pipe N therein, and suitable connections of course will be made with sewers.

The rail A and plate B are spiked upon usual cross ties, and it will be seen that the latter with all the parts thereon can be easily removed when necessary. Should it be desired the part *b* of plate B that receives the slot closer E may be made strong enough for a wheel to be run upon it.

I claim—

1. In combination with a track rail A, a plate forming in connection therewith a conduit for electric conductor, a slot closer, adapted to rest upon a suitable support, and a guide for the closer carried by said plate, as set forth.

2. In combination, the track rail A, a separate plate forming a conduit therewith and having a grooved portion overhanging the rail and a slot closer in the groove and adapted to rest upon the rail edge, as set forth.

3. In combination with a perforated support, a movable contact or circuit closer a fixed contact connected with a conductor, a spring normally pressing the movable contact away from the other and means to attach the same to the support comprising threaded thimbles inclosing the same and engaging opposite sides of the support, as specified.

4. In combination with a perforated support, a movable contact or circuit closer a fixed contact connected with a conductor a spring normally pressing the movable contact away from the other and means to attach the same to the support comprising a threaded sleeve and thimbles screwed thereon and engaging with their ends opposite sides of the support, as specified.

In testimony that I claim the above I have hereunto subscribed my name in the presence of two witnesses.

WILLIAM G. CREIGHTON.

Witnesses:
JOHN B. FOOT,
JAMES A. LOW.